United States Patent
Park et al.

(10) Patent No.: US 8,608,612 B2
(45) Date of Patent: Dec. 17, 2013

(54) PLANETARY GEAR TRAIN OF AUTOMATIC TRANSMISSION FOR VEHICLES

(75) Inventors: Jongsool Park, Hwaseonog-si (KR); Tae Seok Seo, Suwon-si (KR); Hyukjun Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 228 days.

(21) Appl. No.: 13/315,813

(22) Filed: Dec. 9, 2011

(65) Prior Publication Data

US 2012/0329600 A1    Dec. 27, 2012

(30) Foreign Application Priority Data

Jun. 22, 2011  (KR) .................. 10-2011-0060718

(51) Int. Cl.
*F16H 3/44*    (2006.01)
(52) U.S. Cl.
USPC .......................................... 475/296; 475/280
(58) Field of Classification Search
USPC .................. 475/271, 275–291, 296, 330
See application file for complete search history.

(56) References Cited

U.S. PATENT DOCUMENTS

| | | | | |
|---|---|---|---|---|
| 7,601,090 B2 * | 10/2009 | Shim | ............................ | 475/276 |
| 2006/0205556 A1 * | 9/2006 | Klemen | ....................... | 475/296 |
| 2007/0072733 A1 * | 3/2007 | Klemen | ....................... | 475/280 |
| 2008/0039267 A1 * | 2/2008 | Shim | ............................ | 475/280 |
| 2008/0305914 A1 * | 12/2008 | Wittkopp et al. | ............ | 475/276 |
| 2010/0210403 A1 * | 8/2010 | Wittkopp et al. | ............ | 475/275 |
| 2011/0045942 A1 | 2/2011 | Gumpoltsberger et al. | | |
| 2013/0150204 A1 * | 6/2013 | Park et al. | ..................... | 475/276 |

FOREIGN PATENT DOCUMENTS

| | | |
|---|---|---|
| JP | 2006-349153 A | 12/2006 |
| KR | 10-2008-0033789 A | 4/2008 |
| KR | 10-0903341 B1 | 6/2009 |
| KR | 10-0931050 B1 | 12/2009 |
| KR | 10-0963712 B1 | 6/2010 |

* cited by examiner

*Primary Examiner* — Roger Pang
(74) *Attorney, Agent, or Firm* — Morgan, Lewis & Bockius LLP (57) ABSTRACT

A planetary gear train of an automatic may include an input shaft, an output shaft, a first planetary gear set having a first, second and third rotation elements, the first selectively connected to the input shaft, a second planetary gear set having a fourth, fifth and sixth rotation elements, the fourth directly connected to the second rotation element and the fifth directly connected to the input shaft, a compound planetary gear set having seventh, eighth, ninth and tenth rotation elements, the seventh selectively receiving the speed of the input shaft from the fifth, the eighth selectively receiving increased speed from the sixth, the ninth directly connected to the output shaft, and the tenth selectively connected to the input shaft, eight rotation members consisting of at least one of the rotation elements and six friction members.

9 Claims, 4 Drawing Sheets

|    | C1 | C2 | C3 | C4 | B1 | B2 | Gear ratio | Step ratio |
|----|----|----|----|----|----|----|------------|------------|
| D1 | ● |   |   |   |   | ● | 4.80 | D1/D9=9.73 |
| D2 |   | ● |   |   |   | ● | 3.08 | D1/D2=1.56 |
| D3 | ● | ● |   |   |   |   | 2.31 | D2/D3=1.33 |
| D4 |   | ● |   |   | ● |   | 1.59 | D3/D4=1.45 |
| D5 |   | ● |   | ● |   |   | 1.00 | D4/D5=1.59 |
| D6 |   | ● | ● |   |   |   | 0.83 | D5/D6=1.20 |
| D7 |   |   | ● | ● |   |   | 0.70 | D6/D7=1.18 |
| D8 |   |   | ● |   | ● |   | 0.55 | D7/D8=1.28 |
| D9 | ● |   | ● |   |   |   | 0.49 | D8/D9=1.12 |
| REV |   |   |   | ● |   | ● | -2.51 | REV/D1=0.94 |

FIG. 4

PLANETARY GEAR TRAIN OF AUTOMATIC TRANSMISSION FOR VEHICLES

CROSS-REFERENCE TO RELATED APPLICATION

The present application claims the priority of Korean Patent Application Number 10-2011-0060718 filed Jun. 22, 2011, the entire contents of which application is incorporated herein for all purposes by this reference.

BACKGROUND OF INVENTION

1. Field of Invention

The present invention relates to an automatic transmission for vehicles. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control.

In addition, step ratios between neighboring shift-speeds is maintained to be suitable.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and ten-speed automatic transmissions have been developed at a good pace.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a planetary gear train of an automatic transmission for vehicles having advantages of improving power delivery performance and reducing fuel consumption by achieving nine forward speeds and one reverse speed. In addition, the present invention has been made in an effort to provide a planetary gear train of an automatic transmission for vehicles having further advantages of excellent operating condition of friction members and step ratio.

A planetary gear train of an automatic transmission for vehicles according to various aspects of the present invention may include: an input shaft adapted to receive torque of an engine; an output shaft adapted to output a changed torque; a first planetary gear set having a first rotation element selectively connected to the input shaft and adapted to be operated as a selective input element, a second rotation element adapted to be always operated as a fixed element, and a third rotation element adapted to be operated as an output element; a second planetary gear set having a fourth rotation element directly connected to the second rotation element of the first planetary gear set and adapted to be always operated as a fixed element, a fifth rotation element directly connected to the input shaft and adapted to be always operated as an input element and to output a speed of the input shaft, and a sixth rotation element adapted to be always operated as an output element; a compound planetary gear set having four rotation elements, wherein a seventh rotation element adapted to selectively receive the speed of the input shaft from the fifth rotation element of the second planetary gear set or to be operated as a selective fixed element, an eighth rotation element adapted to selectively receive an increased speed from the sixth rotation element of the second planetary gear set or to be operated as a selective fixed element, a ninth rotation element directly connected to the output shaft and adapted to be always operated as an output element, and a tenth rotation element selectively connected to the input shaft and adapted to be operated as a selective input element; eight rotation members consisting of at least one of rotation elements of the first and second planetary gear sets and the compound planetary gear set; and six friction members including clutches interposed between the selected two rotation member among the rotation members or between the selected rotation member and the input shaft and brakes interposed between the selected rotation member among the rotation members and the transmission housing.

A planetary gear train of an automatic transmission for vehicles according to various aspects of the present invention may include: an input shaft adapted to receive torque of an engine; an output shaft adapted to output a changed torque; a first planetary gear set having a first sun gear, a first planet carrier, and a first ring gear as rotation elements thereof; a second planetary gear set having a second sun gear, a second planet carrier, and a second ring gear as rotation elements thereof; a compound planetary gear set formed by combining a third planetary gear set having a third sun gear, a third planet carrier, and a third ring gear as rotation element thereof and a fourth planetary gear set having a fourth sun gear, a fourth planet carrier, and a fourth ring gear as rotation elements thereof; a first rotation member including the first sun gear and selectively connected to the input shaft; a second rotation member including the first planet carrier and the second sun gear and directly connected to a transmission housing; a third rotation member including the first ring gear and the third sun gear and selectively connected to the transmission housing; a fourth rotation member including the second planet carrier, directly connected to the input shaft, and selectively connected to the third rotation member; a fifth rotation member including the second ring gear; a sixth rotation member including the third planet carrier and the fourth ring gear, selectively connected to the fifth rotation member, and selectively connected to the transmission housing; a seventh rotation member including the third ring gear and the fourth planet carrier and directly connected to the output shaft; an eighth rotation member including the fourth sun gear and selectively connected to the input shaft; and six friction members including clutches interposed between the selected two rotation members among the rotation members or between the selected rotation member and the input shaft and brakes interposed between the selected rotation member among the rotation members and the transmission housing.

The first, second, third, and fourth planetary gear sets are single pinion planetary gear sets.

The six friction members may include: a first clutch interposed between the input shaft and the first rotation member; a second clutch interposed between the input shaft and the eighth rotation member; a third clutch interposed between the fifth rotation member and the sixth rotation member; a fourth clutch interposed between the third rotation member and the fourth rotation member; a first brake interposed between the third rotation member and the transmission housing; and a second brake interposed between the sixth rotation member and the transmission housing.

The first clutch and the second brake are operated at a first forward speed, the second clutch and the second brake are operated at a second forward speed, the first clutch and the second clutch are operated at a third forward speed, the second clutch and the first brake are operated at a fourth forward speed, the second clutch and the fourth clutch are operated at a fifth forward speed, the second clutch and the third clutch are operated at a sixth forward speed, the third clutch and the fourth clutch are operated at a seventh forward speed, the third clutch and the first brake are operated at an eighth forward speed, the first clutch and the third clutch are operated at a ninth forward speed, and the fourth clutch and the second brake are operated at a reverse speed.

A planetary gear train of an automatic transmission for vehicles according to other aspects of the present invention may include: an input shaft adapted to receive torque of an engine; an output shaft adapted to output a changed torque; a first planetary gear set having a first sun gear, a first planet carrier, and a first ring gear as rotation elements thereof; a second planetary gear set having a second sun gear, a second planet carrier, and a second ring gear as rotation elements thereof; a compound planetary gear set having a third sun gear, a common planet carrier, a common ring gear, and a fourth sun gear as rotation elements thereof; a first rotation member including the first sun gear and selectively connected to the input shaft; a second rotation member including the first planet carrier and the second sun gear and directly connected to a transmission housing; a third rotation member including the first ring gear and the third sun gear and selectively connected to the transmission housing; a fourth rotation member including the second planet carrier, directly connected to the input shaft, and selectively connected to the third rotation member; a fifth rotation member including the second ring gear; a sixth rotation member including the common planet carrier, selectively connected to the fifth rotation member, and selectively connected to the transmission housing; a seventh rotation member including the common ring gear and directly connected to the output shaft; an eighth rotation member including the fourth sun gear and selectively connected to the input shaft; and six friction members including clutches interposed between the selected two rotation members among the rotation members or between the selected rotation member and the input shaft and brakes interposed between the selected rotation member among the rotation members and the transmission housing.

The first and second planetary gear sets may be single pinion planetary gear sets and the compound planetary gear set may be a planetary gear set of Ravingneaux type.

The six friction members may include: a first clutch interposed between the input shaft and the first rotation member; a second clutch interposed between the input shaft and the eighth rotation member; a third clutch interposed between the fifth rotation member and the sixth rotation member; a fourth clutch interposed between the third rotation member and the fourth rotation member; a first brake interposed between the third rotation member and the transmission housing; and a second brake interposed between the sixth rotation member and the transmission housing.

The first clutch and the second brake are operated at a first forward speed, the second clutch and the second brake are operated at a second forward speed, the first clutch and the second clutch are operated at a third forward speed, the second clutch and the first brake are operated at a fourth forward speed, the second clutch and the fourth clutch are operated at a fifth forward speed, the second clutch and the third clutch are operated at a sixth forward speed, the third clutch and the fourth clutch are operated at a seventh forward speed, the third clutch and the first brake are operated at an eighth forward speed, the first clutch and the third clutch are operated at a ninth forward speed, and the fourth clutch and the second brake are operated at a reverse speed.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification In the detailed description, ordinal numbers are used for distinguishing constituent elements having the same terms, and have no specific meanings.

Figure 1:
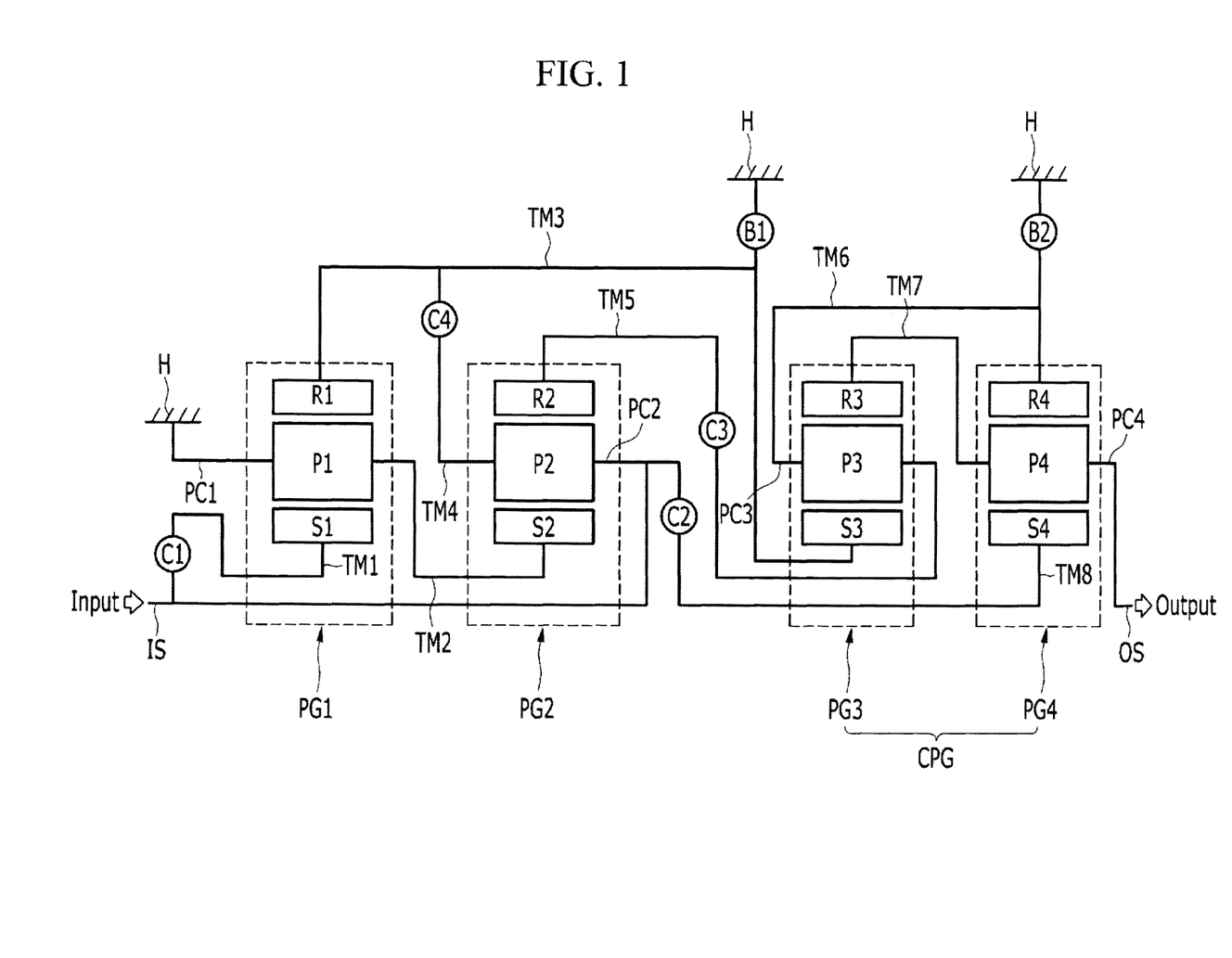
FIG. 1 is a schematic diagram of an exemplary planetary gear train according to the present invention.
Figure 2:
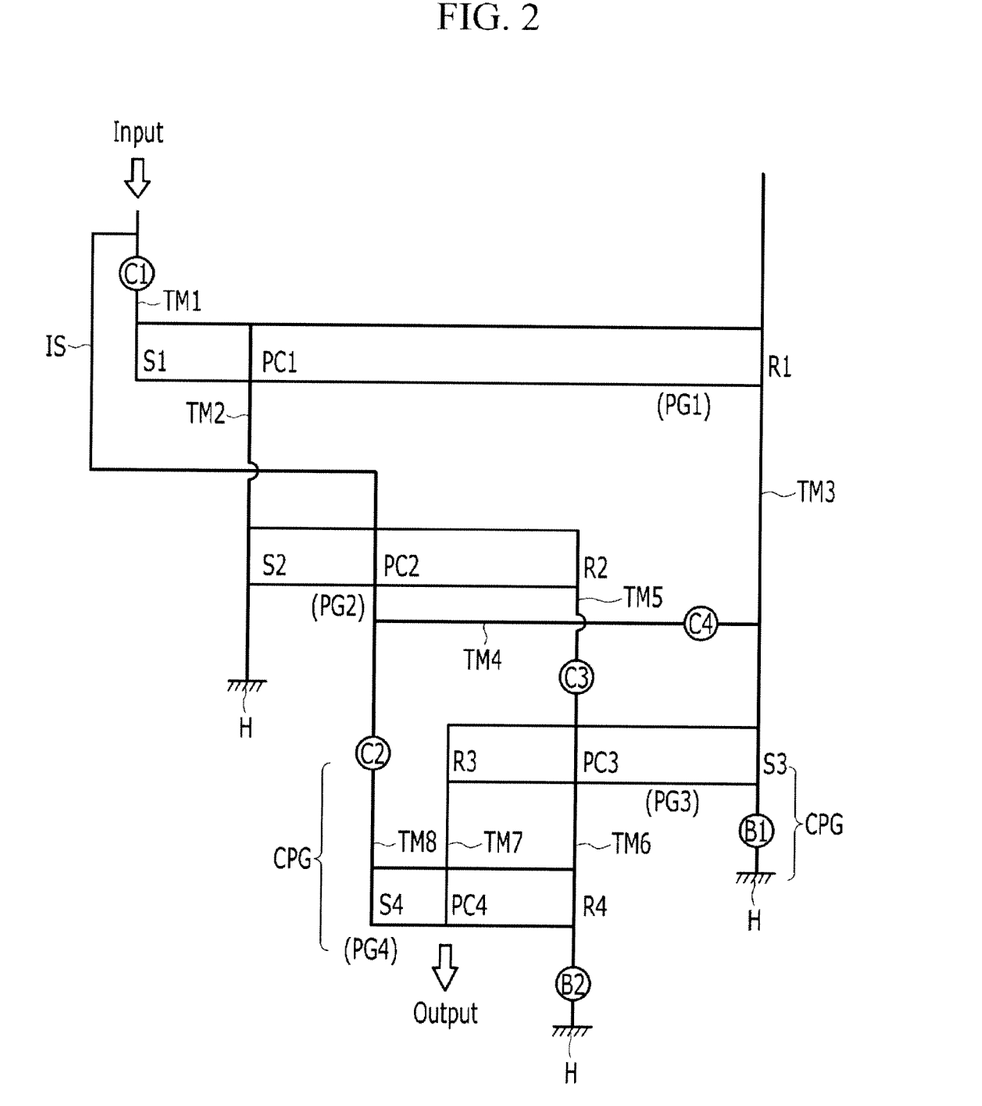
FIG. 2 shows connections in an exemplary planetary gear train according to the present invention.

FIG. 1 is a schematic diagram of a planetary gear train according to various embodiments of the present invention, and FIG. 2 shows connections in a planetary gear train according to various embodiments of the present invention.

Referring to FIG. 1 and FIG. 2, a planetary gear train according to various embodiments includes first, second, third, and fourth planetary gear sets PG1, PG2, PG3, and PG4 disposed on the same axis, an input shaft IS, an output shaft OS, eight rotation members TM1-TM8 formed by directly or selectively connecting rotation elements of the first, second, third, and fourth planetary gear sets PG1, PG2, PG3, and PG4, six friction members C1-C4 and B1-B2, and a transmission housing H.

A rotation speed input from the input shaft IS is changed by the first, second, third, and fourth planetary gear sets PG1, PG2, PG3, and PG4 and is output through the output shaft OS.

In addition, the planetary gear sets are disposed in a sequence of the first, second, third, and fourth planetary gear sets PG1, PG2, PG3, and PG4 from an engine.

The input shaft IS is an input member, and torque from a crankshaft of the engine is changed through a torque converter and is input to the input shaft IS.

The output shaft OS is an output member and delivers driving torque so as to run driving wheels through a differential apparatus.

The first planetary gear set PG1 is a single pinion planetary gear set and includes a first sun gear S1, a first ring gear R1, and a first planet carrier PC1 rotatably supporting a first pinion P1 engaged with the first sun gear S1 and the first ring gear R1.

The second planetary gear set PG2 is a single pinion planetary gear set and includes a second sun gear S2, a second ring gear R2, and a second planet carrier PC2 rotatably supporting a second pinion P2 engaged with the second sun gear S2 and the second ring gear R2.

The third planetary gear set PG3 is a single pinion planetary gear set and includes a third sun gear S3, a third ring gear R3, and a third planet carrier PC3 rotatably supporting a third pinion P3 engaged with the third sun gear S3 and the third ring gear R3.

The fourth planetary gear set PG4 is a single pinion planetary gear set and includes a fourth sun gear S4, a fourth ring gear R4, and a fourth planet carrier PC4 rotatably supporting a fourth pinion P4 engaged with the fourth sun gear S4 and the fourth ring gear R4.

A rotation element of the first planetary gear set PG1 is directly connected to a rotation element of the second planetary gear set PG2, and another rotation element of the first planetary gear set PG1 is selectively connected to another rotation element of the second planetary gear set PG2 such that the first and second planetary gear sets PG1 and PG2 are operated as independent planetary gear sets or are operated as a compound planetary gear set.

The third and fourth planetary gear sets PG3 and PG4 are combined and are operated as a compound planetary gear set CPG. The third and fourth planetary gear sets PG3 and PG4 convert torque delivered from the input shaft IS into nine forward speeds and output them.

Rotation elements of the first, second, third, and fourth planetary gear set PG1, PG2, PG3, and PG4 are connected to each other.

In further detail, the first planet carrier PC1 of the first planetary gear set PG1 is directly connected to the second sun gear S2 of the second planetary gear set PG2, and the first ring gear R1 of the first planetary gear set PG1 is selectively connected to the second planet carrier PC2 of the second planetary gear set PG2 and is directly connected to the third sun gear S3 of the third planetary gear set PG3.

In addition, the third planet carrier PC3 and the third ring gear R3 of the third planetary gear set PG3 are connected to the fourth ring gear R4 and the fourth planet carrier PC4 of the fourth planetary gear set PG4, respectively.

Therefore, the planetary gear train according to various embodiments includes eight rotation members TM1-TM8.

A first rotation member TM1 includes the first sun gear S1 and is selectively connected to the input shaft IS.

A second rotation member TM2 includes the first planet carrier PC1 and the second sun gear S2 and is directly connected to the transmission housing H.

A third rotation member TM3 includes the first ring gear R1 and the third sun gear S3 and is selectively connected to the transmission housing H.

A fourth rotation member TM4 includes the second planet carrier PC2, is directly connected to the input shaft IS, and is selectively connected to the third rotation member TM3.

A fifth rotation member TM5 includes the second ring gear R2.

A sixth rotation member TM6 includes the third planet carrier PC3 and the fourth ring gear R4, is selectively connected to the fifth rotation member TM5, and is selectively connected to the transmission housing H.

A seventh rotation member TM7 includes the third ring gear R3 and the fourth planet carrier PC4 and is directly connected to the output shaft OS.

An eighth rotation member TM8 includes the fourth sun gear S4 and is selectively connected to the input shaft IS.

In addition, selective connections between the rotation members TM1-TM8 or between the rotation members TM1-TM8 and the input shaft IS are performed by clutches C1, C2, C3, and C4.

In addition, selective connections between the rotation members TM1-TM8 and the transmission housing H are performed by brakes B1 and B2.

A first clutch C1 is interposed between the input shaft IS and the first rotation member TM1 and operates the first rotation member TM1 as a selective input element.

A second clutch C2 is interposed between the input shaft IS and the eighth rotation member TM8 and operates the eighth rotation member TM8 as a selective input element.

A third clutch C3 is interposed between the fifth rotation member TM5 and the sixth rotation member TM6 and selectively connects the fifth rotation member TM5 with the sixth rotation member TM6.

A fourth clutch C4 is interposed between the third rotation member TM3 and the fourth rotation member TM4 and selectively connects the third rotation member TM3 with the fourth rotation member TM4.

A first brake B1 is interposed between the third rotation member TM3 and the transmission housing H and operates the third rotation member TM3 as a selective fixed element.

A second brake B2 is interposed between the sixth rotation member TM6 and the transmission housing H and operates the sixth rotation member TM6 as a selective fixed element.

Friction members consisting of the first, second, third, and fourth clutches C1, C2, C3, and C4 and the first and second brakes B1 and B2 are conventional multi-plate friction elements of wet type that are operated by hydraulic pressure.

Figure 3:
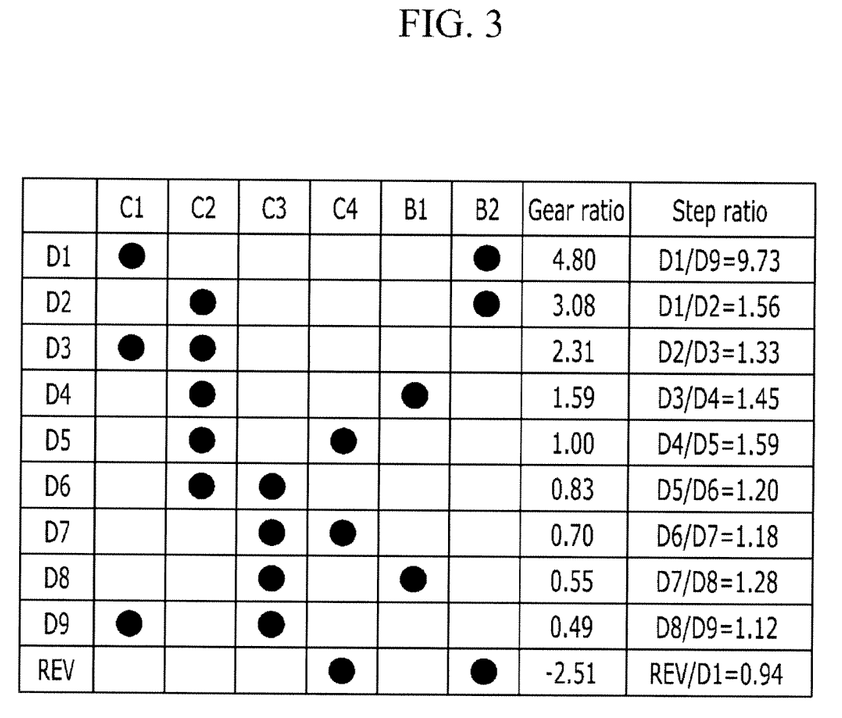
FIG. 3 is an operational chart of friction members at each shift-speed applied to an exemplary planetary gear train according to the present invention.

FIG. 3 is an operational chart of friction members at each shift-speed applied to a planetary gear train according to various embodiments of the present invention.

As shown in FIG. 3, two friction members are operated at each shift-speed according to various embodiments of the present invention.

The first clutch C1 and the second brake B2 are operated at a first forward speed D1.

The second clutch C2 and the second brake B2 are operated at a second forward speed D2.

The first clutch C1 and the second clutch C2 are operated at a third forward speed D3.

The second clutch C2 and the first brake B1 are operated at a fourth forward speed D4.

The second clutch C2 and the fourth clutch C4 are operated at a fifth forward speed D5.

The second clutch C2 and the third clutch C3 are operated at a sixth forward speed D6.

The third clutch C3 and the fourth clutch C4 are operated at a seventh forward speed D7.

The third clutch C3 and the first brake B1 are operated at an eighth forward speed D8.

The first clutch C1 and the third clutch C3 are operated at a ninth forward speed D9.

The fourth clutch C4 and the second brake B2 are operated at a reverse speed REV.

The first planetary gear set PG1 outputs a reduced inverse speed through the third rotation member TM3 by operation of the first clutch C1 at the first forward speed DE the third forward speed D3, and the ninth forward speed D9.

In a state that torque of the input shaft IS is input through the fourth rotation member TM4 including the second planet carrier PC2, the second rotation member TM2 including the second sun gear S2 is always operated as a fixed element. Therefore, the second planetary gear set PG2 outputs an increased speed through the fifth rotation member TM5.

In addition, the fourth rotation member TM4 connects with the third rotation member TM3 by operation of the fourth clutch C4. Therefore, a speed the same as that of the input shaft IS is output through the third rotation member TM3.

The compound planetary gear set CPG formed by combining the third and fourth planetary gear sets PG3 and PG4 realizes nine forward speeds and one reverse speed by using the speed of the input shaft IS, the increased speed, and the reduced inverse speed input from the first and second planetary gear sets PG1 and PG2 through the third rotation member TM3 and the speed of the input shaft IS input to the eighth rotation member TM8 through the second clutch C2. Nine forward speeds and one reverse speed are achieved by control of the first and second brakes B1 and B2.

The planetary gear train according to various embodiments of the present invention may realize nine forward speeds and one reverse speed by combining four planetary gear sets with six friction members and by operating two friction members at each shift-speed.

In addition, hydraulic control system for controlling members may be simplified and cost, weight and installability may be excellent by using six friction members.

Since one friction member is released and another friction member is operated when normal shifting, shift control may be facilitated.

In addition, step ratios between neighboring shift-speeds at low/high shift-speed are almost uniform as shown in FIG.

Figure 4:
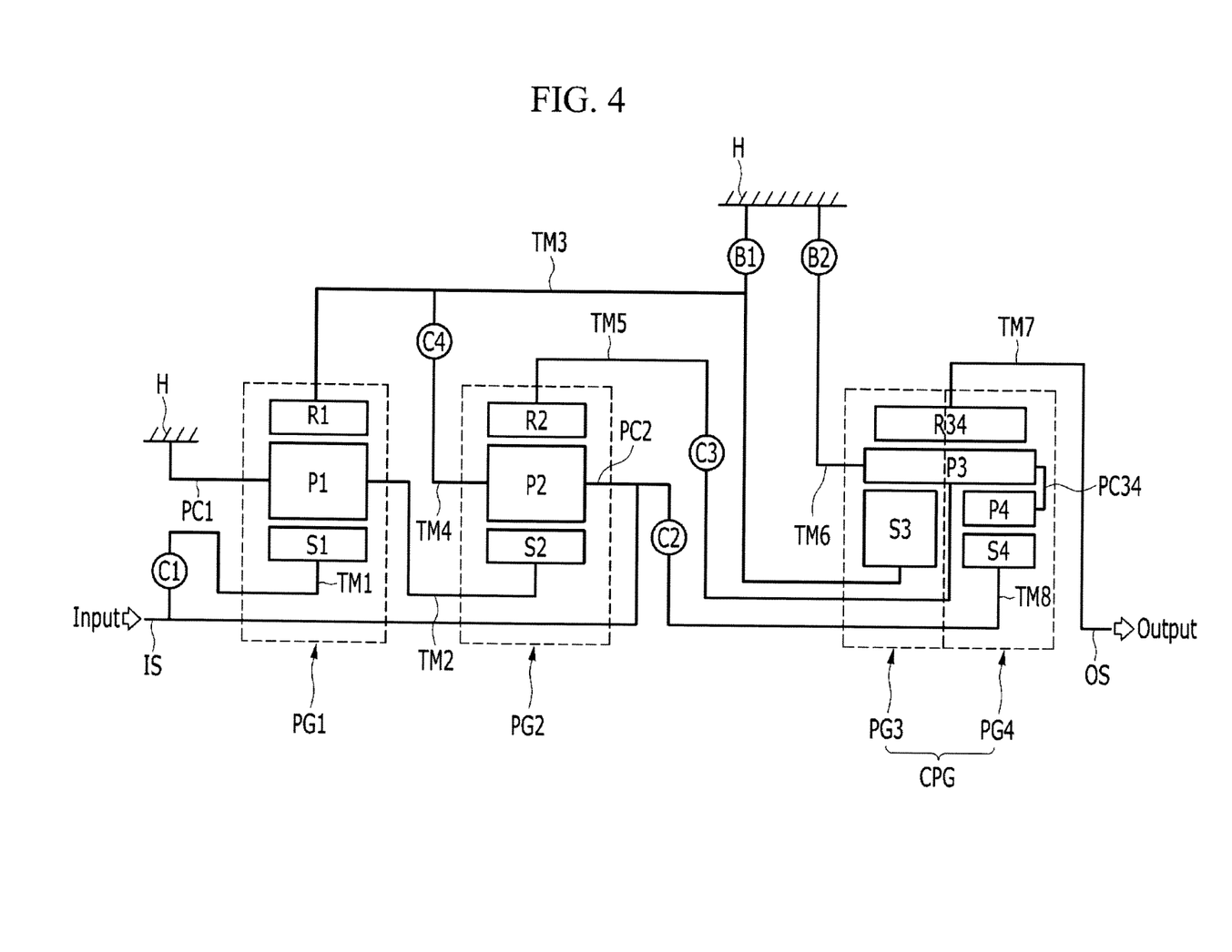
FIG. 4 is a schematic diagram of an exemplary planetary gear train according to the present invention.

FIG. 4 is a schematic diagram of a planetary gear train according to various embodiments of the present invention.

Referring to FIG. 4, a compound planetary gear set according to various embodiments is formed by two single pinion planetary gear sets, but a compound planetary gear set according to various embodiments is a compound planetary gear set of Ravingneaux type.

That is, the compound planetary gear set CPG applied to various embodiments is formed by combining the third planetary gear set PG3 that is a single pinion planetary gear set and the fourth planetary gear set PG4 that is a double pinion planetary gear set, but by having a ring gear and a planet carrier in common.

Therefore, the compound planetary gear set CPG is operated by four rotation elements consisting of a ring gear, a planet carrier, and two sun gears. For convenience of explanation, the ring gear is called a common ring gear R34, the planet carrier is called a common planet carrier PC34, a sun gear engaged with a long pinion P3 is called a third sun gear S3, and a sun gear engaged with a short pinion P4 is called a fourth sun gear S4.

The compound planetary gear set CPG includes the third, sixth, seventh, and eighth rotation members TM3, TM6, TM7, and TM8.

The third rotation member TM3 includes the first ring gear R1 and the third sun gear S3 and is selectively connected to the transmission housing H through the first brake B1.

The sixth rotation member TM6 includes the common planet carrier PC34 and is selectively connected to the transmission housing H through the second brake B2.

The seventh rotation member TM7 includes the common ring gear R34 and is directly connected to the output shaft OS.

The eighth rotation member TM8 includes the fourth sun gear S4 and is selectively connected to the input shaft IS through the second clutch C2.

Although the planetary gear train according to various embodiments of the present invention includes the sixth rotation member TM6 and the seventh rotation member TM7 different from those of various embodiments, operation of the friction members at each shift-speed and shifting processes of various embodiments are the same as those of various embodiments. Therefore, detailed description will be omitted.

A gear ratio of various embodiments may be different from that of various embodiments.

Various embodiments of the present invention may realize nine forward speeds and one reverse speed by combining four planetary gear sets with six friction members and by operating two friction members at each shift-speed.

Since six friction members are used, a hydraulic control system for controlling the same may be simplified, and cost, weight, and installability may be excellent.

Since one friction member is released and another friction member is operated when normal shifting, shift control may be facilitated.

In addition, step ratios between neighboring shift-speeds at low/high shift-speed may be almost uniform The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
   an input shaft adapted to receive torque of an engine;
   an output shaft adapted to output a changed torque;
   a first planetary gear set having a first rotation element
      selectively connected to the input shaft and adapted to be operated as a selective input element, a second rotation element adapted to be always operated as a fixed element, and a third rotation element adapted to be operated as an output element;

a second planetary gear set having a fourth rotation element directly connected to the second rotation element of the first planetary gear set and adapted to be always operated as a fixed element, a fifth rotation element directly connected to the input shaft and adapted to be always operated as an input element and to output a speed of the input shaft, and a sixth rotation element adapted to be always operated as an output element;

a compound planetary gear set having four rotation elements, wherein a seventh rotation element adapted to selectively receive the speed of the input shaft from the fifth rotation element of the second planetary gear set or to be operated as a selective fixed element, an eighth rotation element adapted to selectively receive an increased speed from the sixth rotation element of the second planetary gear set or to be operated as a selective fixed element, a ninth rotation element directly connected to the output shaft and adapted to be always operated as an output element, and a tenth rotation element selectively connected to the input shaft and adapted to be operated as a selective input element;

eight rotation members consisting of at least one of rotation elements of the first and second planetary gear sets and the compound planetary gear set; and six friction members including clutches interposed between the selected two rotation member among the rotation members or between the selected rotation member and the input shaft and brakes interposed between the selected rotation member among the rotation members and the transmission housing.

2. A planetary gear train of an automatic transmission for vehicles, comprising:
an input shaft adapted to receive torque of an engine;
an output shaft adapted to output a changed torque;
a first planetary gear set having a first sun gear, a first planet carrier, and a first ring gear as rotation elements thereof;
a second planetary gear set having a second sun gear, a second planet carrier, and a second ring gear as rotation elements thereof;
a compound planetary gear set formed by combining a third planetary gear set having a third sun gear, a third planet carrier, and a third ring gear as rotation element thereof and a fourth planetary gear set having a fourth sun gear, a fourth planet carrier, and a fourth ring gear as rotation elements thereof;
a first rotation member including the first sun gear and selectively connected to the input shaft;
a second rotation member including the first planet carrier and the second sun gear and directly connected to a transmission housing;
a third rotation member including the first ring gear and the third sun gear and selectively connected to the transmission housing;
a fourth rotation member including the second planet carrier, directly connected to the input shaft, and selectively connected to the third rotation member;
a fifth rotation member including the second ring gear;
a sixth rotation member including the third planet carrier and the fourth ring gear, selectively connected to the fifth rotation member, and selectively connected to the transmission housing;

a seventh rotation member including the third ring gear and the fourth planet carrier and directly connected to the output shaft;
an eighth rotation member including the fourth sun gear and selectively connected to the input shaft; and
six friction members including clutches interposed between the selected two rotation members among the rotation members or between the selected rotation member and the input shaft and brakes interposed between the selected rotation member among the rotation members and the transmission housing.

3. The planetary gear train of claim 2, wherein the first, second, third, and fourth planetary gear sets are single pinion planetary gear sets.

4. The planetary gear train of claim 2, wherein the six friction members comprises:
a first clutch interposed between the input shaft and the first rotation member;
a second clutch interposed between the input shaft and the eighth rotation member;
a third clutch interposed between the fifth rotation member and the sixth rotation member;
a fourth clutch interposed between the third rotation member and the fourth rotation member;
a first brake interposed between the third rotation member and the transmission housing; and
a second brake interposed between the sixth rotation member and the transmission housing.

5. The planetary gear train of claim 4, wherein the first clutch and the second brake are operated at a first forward speed,
the second clutch and the second brake are operated at a second forward speed,
the first clutch and the second clutch are operated at a third forward speed,
the second clutch and the first brake are operated at a fourth forward speed,
the second clutch and the fourth clutch are operated at a fifth forward speed,
the second clutch and the third clutch are operated at a sixth forward speed,
the third clutch and the fourth clutch are operated at a seventh forward speed,
the third clutch and the first brake are operated at an eighth forward speed,
the first clutch and the third clutch are operated at a ninth forward speed, and
the fourth clutch and the second brake are operated at a reverse speed.

6. A planetary gear train of an automatic transmission for vehicles, comprising:
an input shaft adapted to receive torque of an engine;
an output shaft adapted to output a changed torque;
a first planetary gear set having a first sun gear, a first planet carrier, and a first ring gear as rotation elements thereof;
a second planetary gear set having a second sun gear, a second planet carrier, and a second ring gear as rotation elements thereof;
a compound planetary gear set having a third sun gear, a common planet carrier, a common ring gear, and a fourth sun gear as rotation elements thereof;
a first rotation member including the first sun gear and selectively connected to the input shaft;
a second rotation member including the first planet carrier and the second sun gear and directly connected to a transmission housing;

a third rotation member including the first ring gear and the third sun gear and selectively connected to the transmission housing;

a fourth rotation member including the second planet carrier, directly connected to the input shaft, and selectively connected to the third rotation member;

a fifth rotation member including the second ring gear;

a sixth rotation member including the common planet carrier, selectively connected to the fifth rotation member, and selectively connected to the transmission housing;

a seventh rotation member including the common ring gear and directly connected to the output shaft;

an eighth rotation member including the fourth sun gear and selectively connected to the input shaft; and six friction members including clutches interposed between the selected two rotation members among the rotation members or between the selected rotation member and the input shaft and brakes interposed between the selected rotation member among the rotation members and the transmission housing.

7. The planetary gear train of claim 6, wherein the first and second planetary gear sets are single pinion planetary gear sets and the compound planetary gear set is a Ravingneaux planetary gear set.

8. The planetary gear train of claim 7, wherein the six friction members comprises:

a first clutch interposed between the input shaft and the first rotation member;

a second clutch interposed between the input shaft and the eighth rotation member;

a third clutch interposed between the fifth rotation member and the sixth rotation member;

a fourth clutch interposed between the third rotation member and the fourth rotation member;

a first brake interposed between the third rotation member and the transmission housing; and a second brake interposed between the sixth rotation member and the transmission housing.

9. The planetary gear train of claim 8, wherein the first clutch and the second brake are operated at a first forward speed, the second clutch and the second brake are operated at a second forward speed, the first clutch and the second clutch are operated at a third forward speed, the second clutch and the first brake are operated at a fourth forward speed, the second clutch and the fourth clutch are operated at a fifth forward speed, the second clutch and the third clutch are operated at a sixth forward speed, the third clutch and the fourth clutch are operated at a seventh forward speed, the third clutch and the first brake are operated at an eighth forward speed, the first clutch and the third clutch are operated at a ninth forward speed, and the fourth clutch and the second brake are operated at a reverse speed.

* * * * *